(12) United States Patent
Yang et al.

(10) Patent No.: US 10,809,218 B2
(45) Date of Patent: Oct. 20, 2020

(54) APPARATUS AND METHOD FOR DETECTING PARTICULATE MATTER

(71) Applicants: HYUNDAI MOTOR COMPANY, Seoul (KR); KIA MOTORS CORPORATION, Seoul (KR)

(72) Inventors: Sang-Hyeok Yang, Suwon-si (KR); Dong-Gu Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/812,863

(22) Filed: Nov. 14, 2017

(65) Prior Publication Data

US 2018/0195993 A1  Jul. 12, 2018

(30) Foreign Application Priority Data

Jan. 12, 2017 (KR) .......................... 10-2017-0004877

(51) Int. Cl.
*G01N 27/22* (2006.01)
*G01N 15/06* (2006.01)
*G01N 15/00* (2006.01)

(52) U.S. Cl.
CPC ......... *G01N 27/22* (2013.01); *G01N 15/0606* (2013.01); *G01N 15/0656* (2013.01); *G01N 2015/0046* (2013.01)

(58) Field of Classification Search
CPC . G01N 27/22; G01N 15/0606; G01N 15/0656
USPC ...................................................... 73/28.02
See application file for complete search history.

(56) References Cited

U.S. PATENT DOCUMENTS

| 8,578,756 | B2* | 11/2013 | Suzuki | G01N 15/0656 73/28.01 |
| 2007/0158191 | A1* | 7/2007 | Berger | G01N 15/0656 204/421 |
| 2008/0034839 | A1* | 2/2008 | Ante | G01N 1/2205 73/23.31 |

(Continued)

FOREIGN PATENT DOCUMENTS

| JP | 5493974 B2 | 5/2014 |
| KR | 10-2016-0032908 A | 3/2016 |
| KR | 10-1652981 B1 | 9/2016 |

*Primary Examiner* — Nimeshkumar D Patel
*Assistant Examiner* — Jean F Morello
(74) *Attorney, Agent, or Firm* — Morgan, Lewis & Bockius LLP

(57) ABSTRACT

In detecting a particulate matter (PM), which measures a change in capacitance depending on induction of the particulate matter, an apparatus for detecting a particulate matter includes: a power supply unit applying bias voltage for inducing the PM; a detection unit forming a magnetic field by using detected voltage applied from the bias voltage and generating PM resistance by the PM by inducing the PM to the magnetic field; and a measurement unit including a first capacitor and a second capacitor in series and measuring the changed capacitance of the first capacitor and the second capacitor according to a change in PM resistance by connecting any one capacitor to the detection unit in parallel. A method for detecting a particulate matter includes: applying bias voltage; generating PM resistance; and measuring changed capacitance according to a change in PM resistance by using the apparatus.

9 Claims, 6 Drawing Sheets

(56) References Cited

U.S. PATENT DOCUMENTS

| | | | |
|---|---|---|---|
| 2010/0000863 A1* | 1/2010 | Kondo | G01N 15/0656 |
| | | | 204/406 |
| 2012/0103058 A1* | 5/2012 | Maeda | G01N 15/0656 |
| | | | 73/23.33 |
| 2012/0119759 A1* | 5/2012 | Nelson | F02D 41/1466 |
| | | | 324/691 |
| 2012/0312074 A1* | 12/2012 | Allmendinger | G01N 1/2252 |
| | | | 73/23.31 |
| 2013/0219990 A1* | 8/2013 | Allmendinger | G01N 33/0027 |
| | | | 73/23.31 |
| 2014/0091811 A1* | 4/2014 | Potyrailo | G06K 19/0717 |
| | | | 324/602 |
| 2015/0168285 A1* | 6/2015 | Hedayat | G01M 15/102 |
| | | | 73/23.33 |
| 2015/0253233 A1 | 9/2015 | Brueck et al. | |
| 2015/0276641 A1* | 10/2015 | Lueck | G01N 27/74 |
| | | | 324/204 |
| 2016/0097752 A1* | 4/2016 | Weber | G01K 7/16 |
| | | | 73/1.06 |

\* cited by examiner

APPARATUS AND METHOD FOR DETECTING PARTICULATE MATTER

CROSS-REFERENCE TO RELATED APPLICATIONS

This application claims priority under 35 U.S.C. § 119 to Korean Patent Application No. 10-2017-0004877 filed on Jan. 12, 2017, in the Korean Intellectual Property Office, the disclosure of which is incorporated herein by reference in its entirety.

BACKGROUND

1. Field

The present disclosure relates to an apparatus and a method for detecting a particulate matter.

2. Description of the Related Art

In general, as exhaust regulations are further tightened, there is a growing interest in a post-treatment apparatus for purifying exhaust gas, and in particular, a particulate matter (PM) in diesel automobiles is more strictly regulated. In order to reduce an emission amount of such a particulate matter, a diesel particulate filter (DPF) is installed at the rear end of an engine to burn and filter the particulate matter. However, when the diesel particulate filter becomes obsolete or defective after installation, filtering efficiency is reduced. Accordingly, since 1989, constructing on-board diagnosis (OBD) system for detecting whether the diesel particulate filter normally operates in real time is required in an automobile.

Korean Patent Registration No. 10-2016-0032908 (Sensor Circuit for Detecting Particulate Matter in Exhaust Gas and Apparatus Using the Same and Driving Method Thereof) discloses a sensor circuit and an apparatus for detecting a particulate matter in exhaust gas and a driving method thereof.

The disclosure of this section is to provide background of the invention. Applicant notes that this section may contain information available before this application. However, by providing this section, Applicant does not admit that any information contained in this section constitutes prior art.

SUMMARY

One aspect provides an apparatus and a method for detecting a particulate matter, and particularly, to a sensor structure which can measure a change in capacitance simultaneously with applying bias voltage without using a switch.

An embodiment of the present invention provides an apparatus for detecting a particulate matter (PM), which measures a change in capacitance depending on induction of the particulate matter, including: a power supply unit applying bias voltage for inducing the PM; a detection unit forming a magnetic field by using detected voltage applied from the bias voltage and generating PM resistance by the PM by inducing the PM to the electric field; and a measurement unit including a first capacitor and a second capacitor in series and measuring the changed capacitance of the first capacitor and the second capacitor according to a change in PM resistance by connecting any one capacitor to the detection unit in parallel.

Preferably, the power supply unit may further include bias resistance connected to a terminal to which the bias voltage is applied in series, and control the detected voltage applied from the bias voltage by controlling the bias resistance.

Preferably, the bias resistance may adopt Mega ohm (MΩ) based resistance and be set to minimally output the capacitance before applying the bias voltage.

Preferably, the detection unit may further include a connection terminal receiving the detected voltage, and the connection terminal may be installed to be spaced in order to form the magnetic field for inducting the PM.

Preferably, when the PM resistance increases and a short-circuit thus occurs, the detection unit may increase the capacitance of the measurement unit to the maximum value by cutting off any one capacitor connected in parallel between the first capacitor and the second capacitor.

Preferably, the power supply unit and the measurement unit are electrically separated from each other to apply the bias voltage without a switching operation and measure the capacitance simultaneously with applying the bias voltage.

Another embodiment of the present invention provides a method for detecting a particulate matter, including: applying, by a power supply unit, bias voltage for inducing the PM; forming, by a detection unit, a magnetic field by using detected voltage applied from the bias voltage and generating PM resistance by the PM by inducing the PM to the magnetic field; and measuring, by a measurement unit including a first capacitor and a second capacitor in series and connecting any one capacitor to the detection unit in parallel, changed capacitance of the first capacitor and the second capacitor according to a change in PM resistance.

Preferably, the applying of the voltage may include controlling the detected voltage of the detection unit by controlling bias resistance connected to a terminal to which the bias voltage is applied in series.

Preferably, the generating of the PM resistance may include increasing the PM resistance by inducing the PM, shorting the detection unit by increasing the PM resistance, and cutting off any one capacitor connected in parallel between the first capacitor and the second capacitor.

Preferably, the measuring of the capacitance may include increasing the capacitance measured by the measurement unit by cutting off any one capacitor to a maximum value.

According to embodiments of the present invention, a power supply unit applying bias voltage and a measurement unit measuring capacitance are separated from each other to form an electric field while performing measurement.

There is an economical advantage because PMs can be collected by using small resistance in order to form an electrode.

DETAILED DESCRIPTION OF THE EMBODIMENTS

Figure 1:
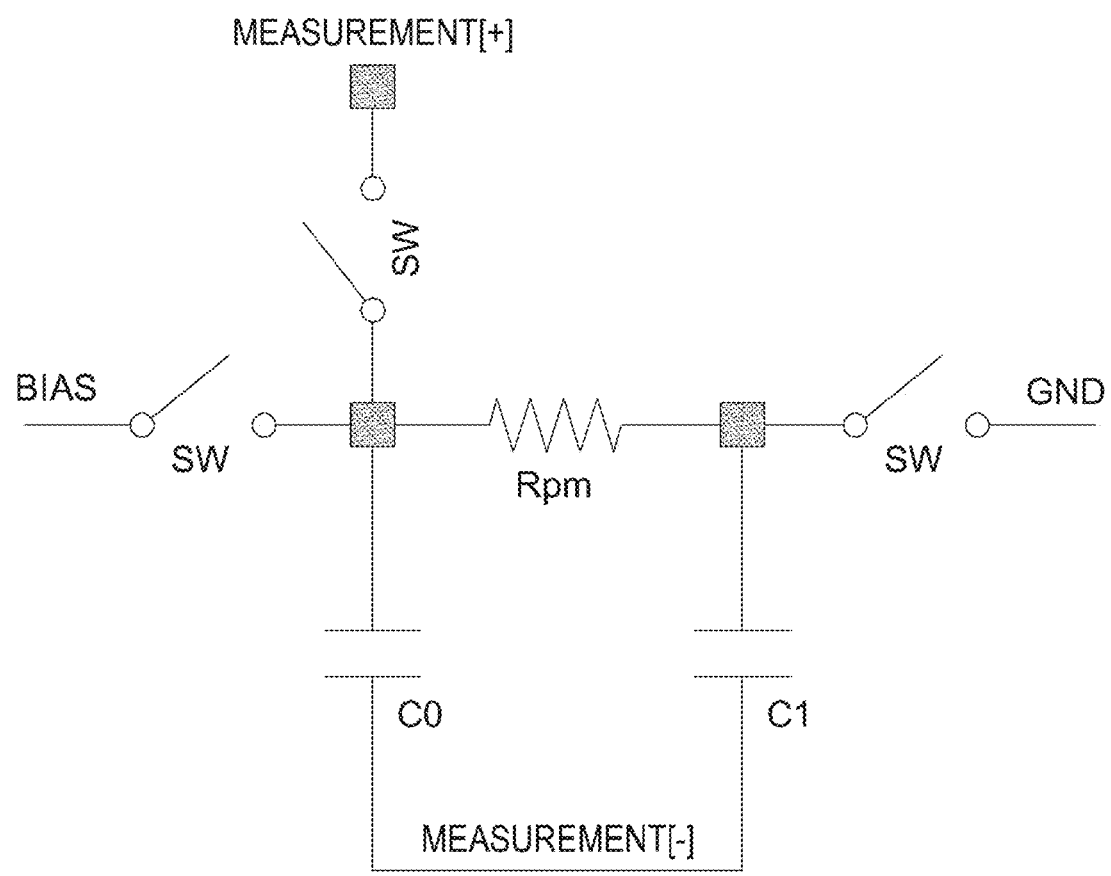
FIG. 1 illustrates a circuit diagram of an apparatus for detecting a particulate matter.

Hereinafter, embodiments of the present invention will be described in detail with reference to contents disclosed in the accompanying drawings. However, the present invention is not restricted or limited by embodiments. Like reference numerals presented in each drawing refer to like elements that perform substantially the same functions.

Aspects and effects of the present invention may be naturally appreciated or more clear by the following description and the aspects and effects of the present invention are not limited only by the following disclosure. Further, in the following description, a detailed explanation of known technologies associated with the present invention may be omitted to avoid unnecessarily obscuring the subject matter of the present invention.

In a PM sensor for a vehicle, the PMs are accumulated on a measuring electrode of a sensor and the quantity of generated PMs is measured by measuring a change degree of an electrical property due to the accumulated PMs. In this case, in order to improve sensitivity, the PMs need to be normally accumulated on the surface of the sensor. To this end, a method for forming an electric field by applying (+) and (−) DC bias voltage to both ends of the electrode is used and this method uses a property in which the PM has a charge and an accumulation property may be dramatically enhanced as compared with a case where there is no bias voltage.

A typical PM sensor includes a charging/discharging unit for performing charging and discharging operations in connection with the sensor unit in parallel, a power supply unit supplying power to the charging/discharging unit, a power supply control unit controlling the power supplied to the charging/discharging unit, a voltage change amount comparing unit comparing a voltage change amount measured at the time of discharging the charging/discharging unit and a predetermined reference change amount, and an adsorption degree determining unit determining an adsorption degree of the detected exhaust gas particulate matter according to a comparison result.

However, when DC bias voltage is applied to a node measuring capacitance at the time of measuring the capacitance, all charges are fixed by bias voltage, and as a result, a change in capacitance cannot be measured. Therefore, a bias voltage application mode and a bias voltage measurement mode are dividedly used. For disconnecting the bias voltage a switch is used. In this case, a switch for 10 V or higher and having high OFF state resistance can be used, and a power switch or resistor which is relatively expensive needs to be used.

FIG. 1 illustrates a circuit diagram of an apparatus 1 for detecting a particulate matter. Referring to FIG. 1, since a node for measurement and a node for applying bias voltage need to be commonly positioned, a switch for separating both functions is particularly required and the switch is required in all DC nodes including GND (ground) by a capacitor which increases in parallel. Further, since movement of a charge needs to be close to 0 while the used switch is in an OFF state, the switch may be used only when OFF-state resistance needs to be as large as several Mega Ohm or more and the switch that satisfies the OFF state resistance condition is relatively expensive, and as a result, a price of a sensor increases.

Figure 2:
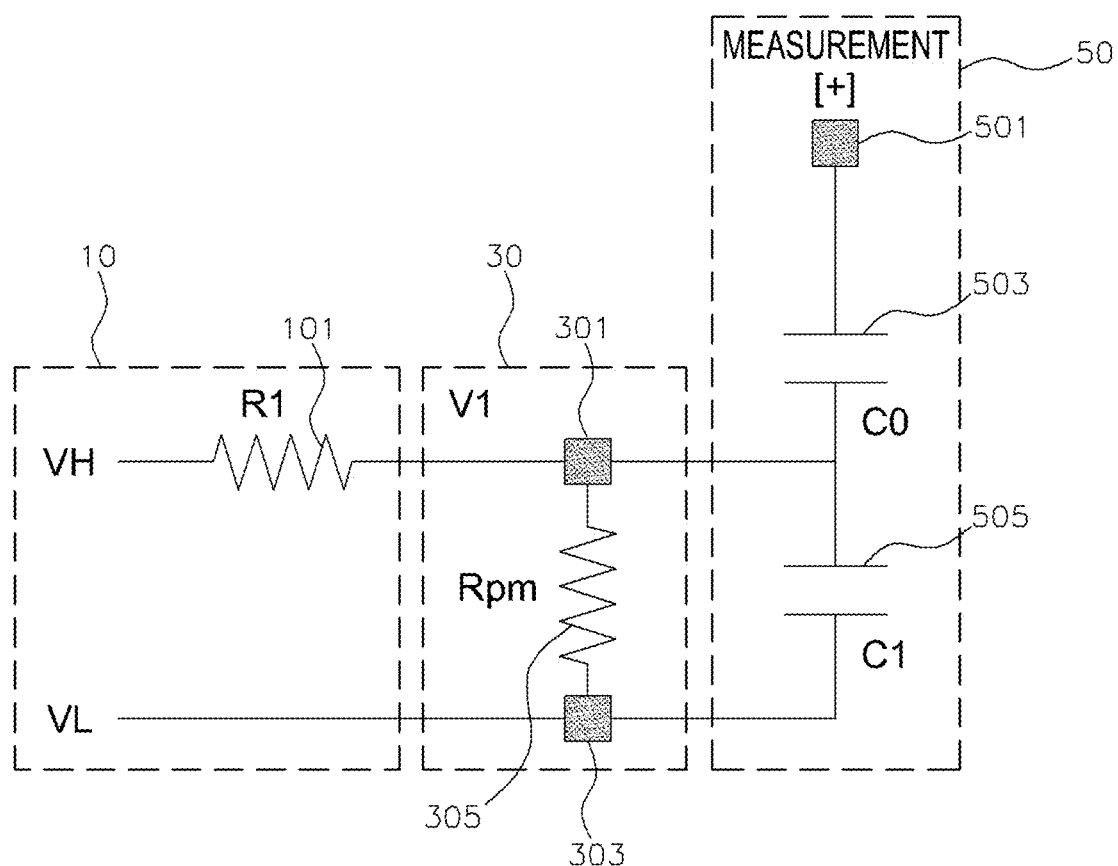
FIG. 2 illustrates a circuit diagram of an apparatus for detecting a particulate matter according to an embodiment of the present invention.

FIG. 2 illustrates a circuit diagram of an apparatus 1 for detecting a particulate matter according to an embodiment of the present invention. Referring to FIG. 2, the apparatus 1 for detecting a particulate matter may include a power supply unit 10, a detection unit 30, and a measurement unit 50.

The power supply unit 10 may apply bias voltage for inducing a particulate matter (PM). The power supply unit 10 may further include a bias resistance 101 connected to a terminal to which the bias voltage is applied in series and control sensed voltage applied from the bias voltage by controlling the bias resistance 101.

The power supply unit 10 may be supplied in connection to VH and VL terminals and apply power so as to form a magnetic field or an electric field in the detection unit 30. The power supply unit 10 may supply the power to the detection unit 30 by reducing consumed power of the bias resistance 101 by connecting the bias resistance 101 between the power supply unit 10 and the detection unit 30. In the embodiment of the present invention, it will be described below that the bias resistance 101 is connected to the VH, but the bias resistance 101 may be connected even to the VL.

The detection unit 30 may form the magnetic field by using the detected voltage applied from the bias voltage and generate a PM resistance 305 by the PM by inducing the PM to the magnetic field.

The detection unit 30 needs to increase an accumulation amount by collecting the PMs with a strong electric field and the measurement unit 50 needs to be able to read the resulting change of capacitance. When an operation of applying the electric field and an operation of measuring the electric field are separated from each other, a separate switch, and the like are required, and as a result, both functions need to be satisfied without an additional part as possible.

The detection unit 30 may further include a connection terminal receiving the detected voltage and a connection terminal (one side) 301 and a connection terminal (the other side) 303 may be installed to be spaced apart from each other in order to form the magnetic field for inducing the PM. In the embodiment of the present invention, the detection unit 30 may form a larger space than the related art and deposit the particulate matter in the space. As the particulate matter is deposited, resistance is converged to 0 from infinity, and as a result, a short-circuit effect may be shown.

When the PM resistance 305 decreases and a short-circuit thus occurs, the detection unit 30 cuts off any one capacitor connected in parallel between a first capacitor 503 and a second capacitor 505 to increase the capacitance of the measurement unit 50 to a maximum value.

The measurement unit 50 may include a measurement node (one side) 501 and a measurement node (the other side) 507 and includes the first capacitor 503 and the second capacitor 505 in series and connects any one capacitor to the detection unit 30 in parallel to measure the changed capacitance of the first capacitor 503 and the second capacitor 505 according to a change in the PM resistance 305. In the embodiment of the present invention, a method that measure the capacitance with the voltage is adopted, but the present invention is not limited thereto.

Figure 3:
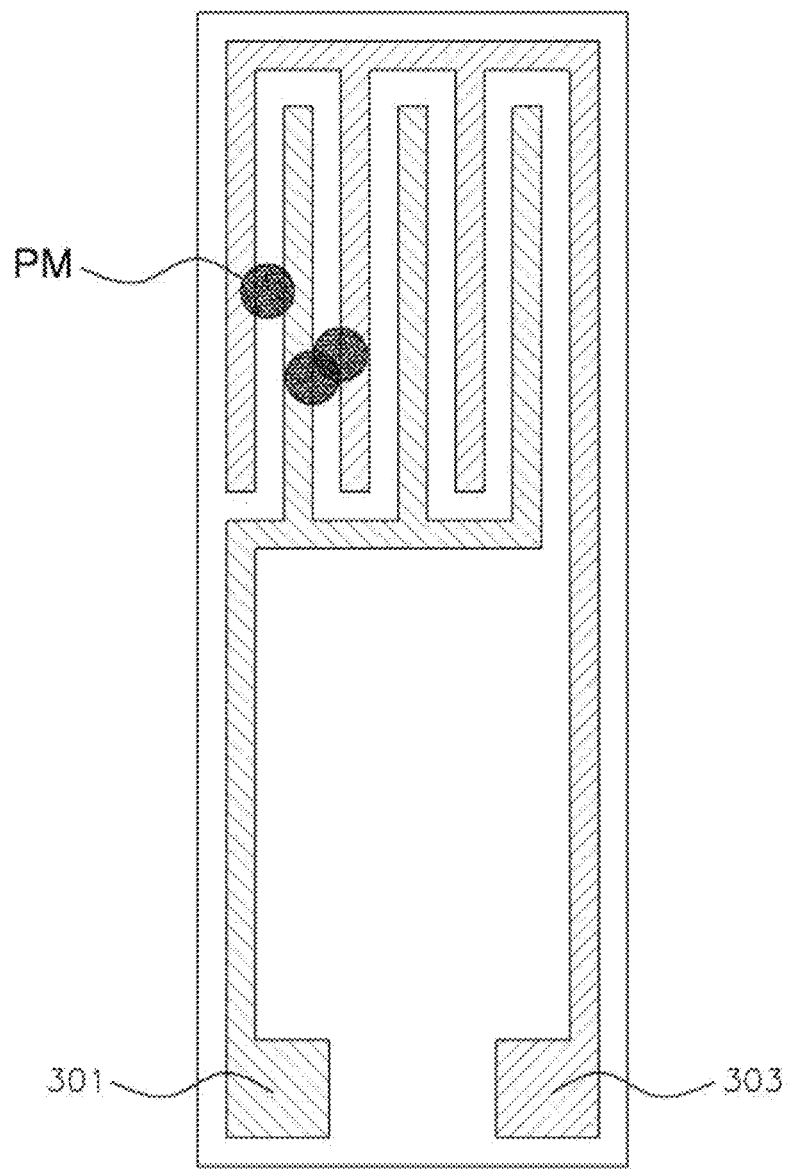
FIG. 3 illustrates a case where resistance is formed through a PM in a detection unit according to an embodiment of the present invention.

FIG. 3 illustrates a case where the resistance is formed through the PM in a detection unit 30 according to the embodiment of the present invention. Referring to FIG. 3, in the detection unit 30, two polar plates are substantially connected to the connection terminals and when the detected voltage is applied, an electric field is formed between the polar plates to collect the particulate matter.

The bias resistance 101 adopts Mega ohm (MΩ) based resistance and may be set to minimally output the capacitance before applying the bias voltage. When the bias resistance 101 is initially high and the capacitance is measured by the measurement unit 50, a minimum value [C=(C0*C1)/(C0+C1)] of the capacitor connected in series is shown and the maximum capacitance [C=CO] is shown afterwards to detect the collection of the particulate matter.

The PM resistance 305 is formed by the particulate matter and as a value of the resistance decreases, an offset degree of C1 increases, and as a result, the PM resistance 305<<1. Therefore, when the connection terminal is short-circuited, an influence of C1 is completely removed, and as a result, only CO which is the maximum value remains.

Figure 4:
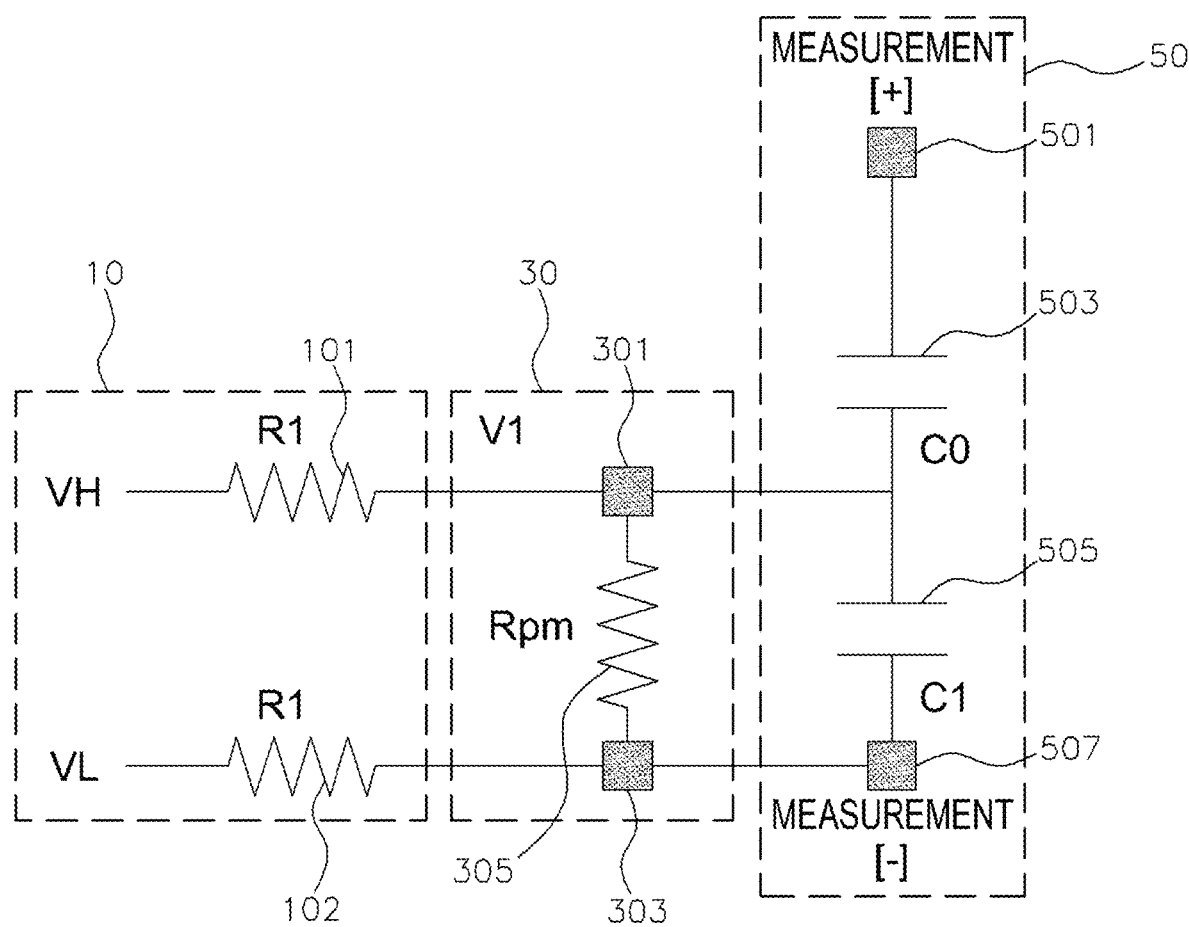
FIG. 4 illustrates a circuit diagram in which bias resistance is additionally installed according to another embodiment of the present invention.

FIG. 4 illustrates a circuit diagram in which bias resistance 102 is additionally installed according to another embodiment of the present invention. Referring to FIG. 4, as another embodiment of the present invention, when not GND and a measurement (+) part but another reference electrode such as measurement (−) is required in the measurement unit 50, the reference electrode may be provided by installing the additional bias resistance 102.

Figure 5:
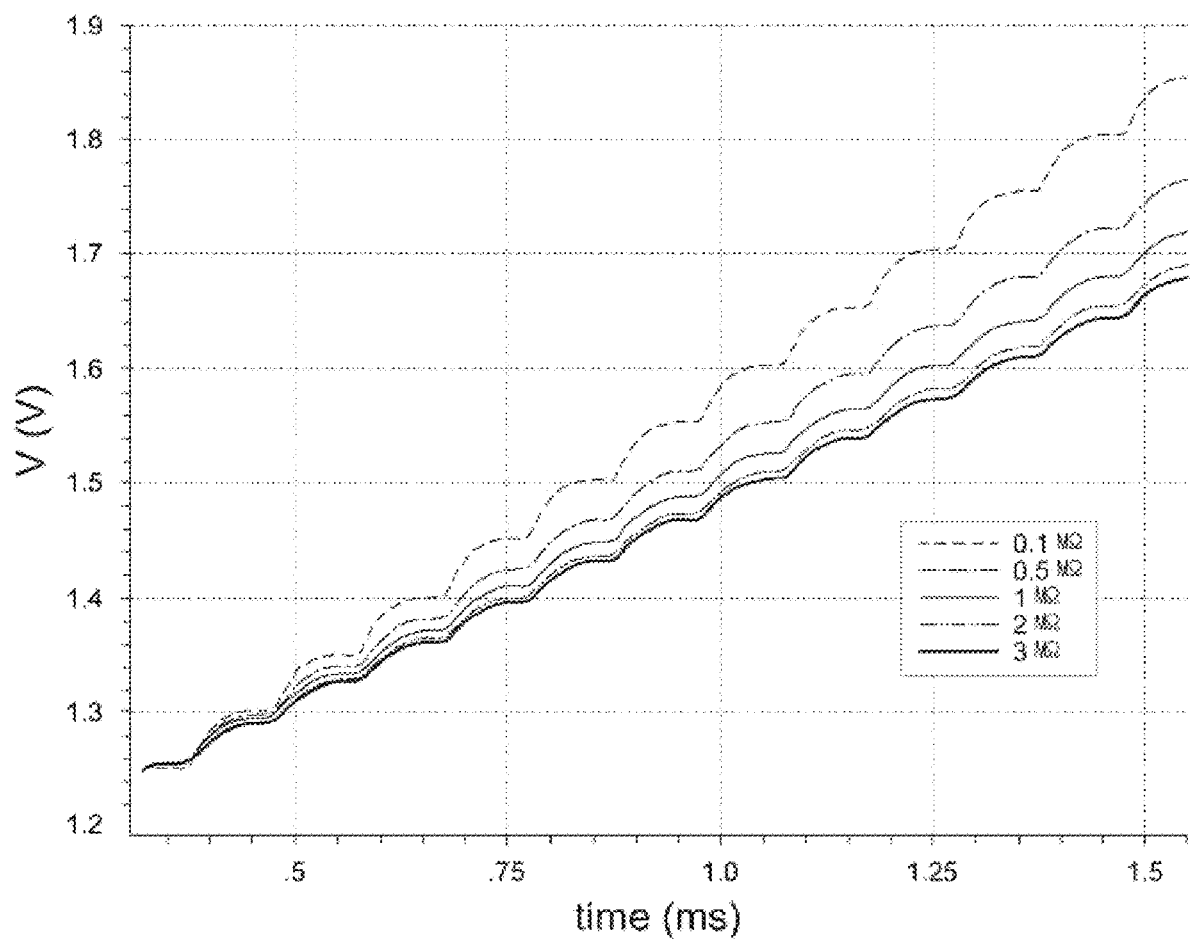
FIG. 5 is a graph showing capacitance as an output voltage value by modeling PM resistance of the detection unit according to the embodiment of the present invention.

FIG. 5 is a graph showing capacitance as an output voltage value by modeling PM resistance of the detection unit 30 according to the embodiment of the present invention. Referring to FIG. 5, it can be seen that when the change in capacitance is measured by arbitrarily setting the PM resistance 305 according to predetermined bias voltage, as the resistance value decreases, the width of a voltage change increases.

Therefore, the change amount of the PM may be verified and when a gradient increases through a result of the graph, output voltage may be verified in a more detailed scale, and as a result, an advantage depending on a decrease in resistance may be generated.

Hereinafter, a method for detecting a particulate matter by using the apparatus 1 for detecting a particulate matter will be described.

Figure 6:
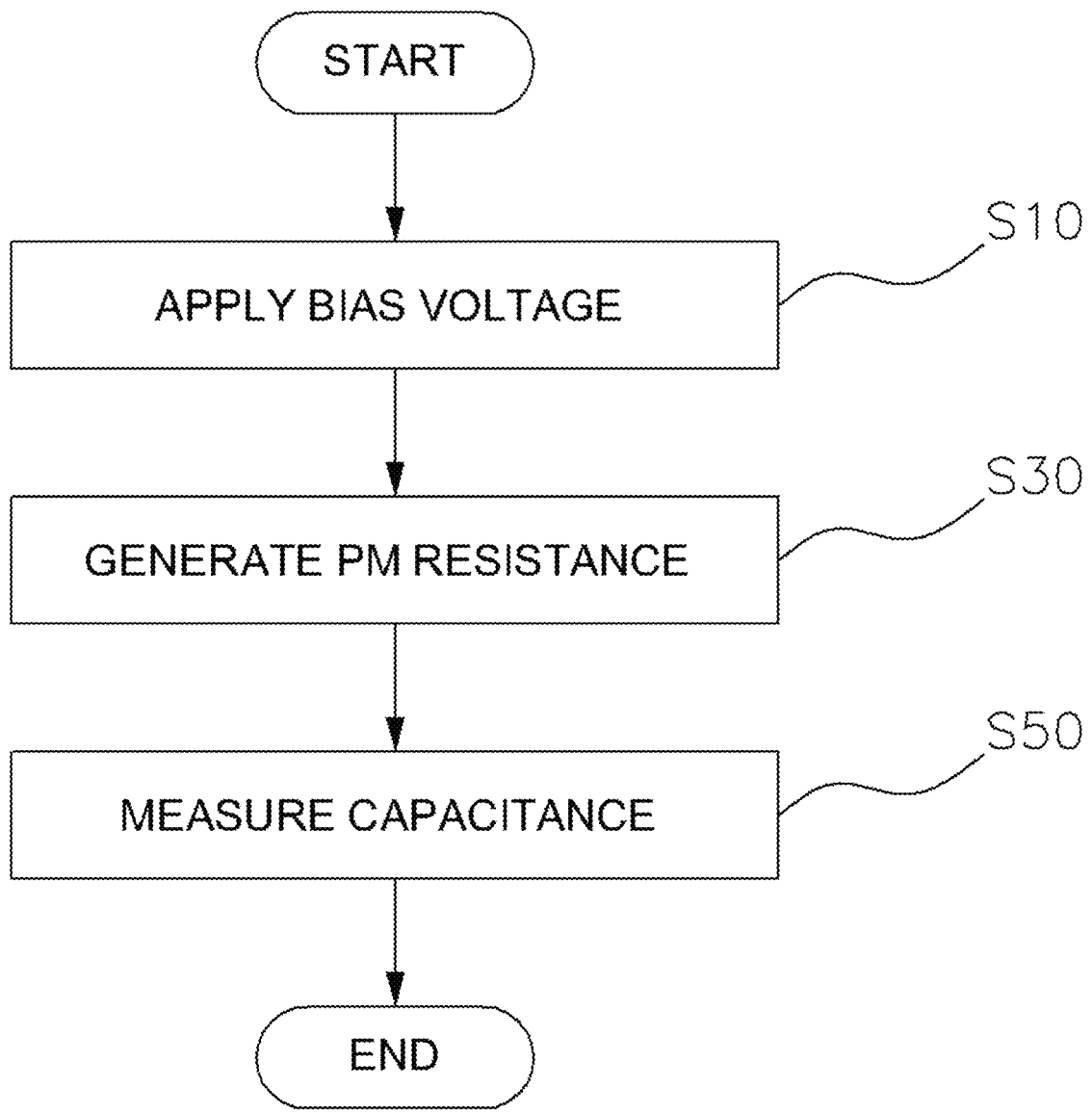
FIG. 6 illustrates a flowchart of a method for detecting a particulate matter according to an embodiment of the present invention.

FIG. 6 illustrates a flowchart of a method for detecting a particulate matter according to an embodiment of the present invention. Referring to FIG. 1, the method for detecting a particulate matter may include applying the bias voltage (S10), generating the PM resistance 305 (S30), and measuring the capacitance (S50).

In the applying of the bias voltage (S10), the voltage is applied from the power supply unit 10 to the detection unit 30 in order to form the magnetic field for inducing the PM. The applying of the bias voltage (S10) may include controlling the detected voltage of the detection unit 30 by controlling the bias resistance 101 connected to the terminal to which the bias voltage is applied in series.

The applying of the bias voltage by the power supply unit 10 (S10) may further include the bias resistance 101 connected to the terminal to which the bias voltage is applied in series and control the detected voltage applied from the bias voltage by controlling the bias resistance 101.

The power supply unit 10 may be supplied in connection to the VH and VL terminals and apply the power so as to form the magnetic field or electric field in the detection unit 30. The power supply unit 10 may supply the power to the detection unit 30 by reducing consumed power of the bias resistance 101 by connecting the bias resistance 101 between the power supply unit 10 and the detection unit 30.

In the generating of the PM resistance 305 (S30), the detection unit 30 forms the magnetic field by using the detected voltage applied from the bias voltage and the PM is induced to the magnetic field. The generating of the PM resistance 305 (S30) may include increasing the PM resistance 305 by inducing the PM, shorting the detection unit 30 by increasing the PM resistance 305, and cutting off any one capacitor connected in parallel between the first capacitor 503 and the second capacitor 505.

In the generating of the PM resistance 305 (S30), when the PM resistance 305 increases and the short-circuit thus occurs, the detection unit 30 cuts off any one capacitor connected in parallel between the first capacitor 503 and the second capacitor 505 to increase the capacitance of the measurement unit 50 to the maximum value. As the particulate matter is deposited, the resistance is converged to 0 from infinity, and as a result, the short-circuit effect may be shown.

In the measuring of the capacitance (S50), the measurement unit 50 that includes the first capacitor 503 and the second capacitor 505 in series and connects any one capacitor to the detection unit 30 in parallel measures the changed capacitance of the first capacitor 503 and the second capacitor 505 according to the change in the PM resistance 305.

The measuring of the capacitance (S50) may include increasing the capacitance measured by the measurement unit 50 to the maximum value by cutting off any one capacitor. When the bias resistance 101 is initially high and the capacitance is measured by the measurement unit 50, a minimum value of the capacitor connected in series is shown and the maximum capacitance is shown afterwards to detect the collection of the particulate matter.

Embodiments of the present invention provide the apparatus and the method for detecting a particulate matter, in which the power supply unit 10 and the measurement unit 50 are electrically separated from each other to apply the bias voltage without a switching operation and measure the capacitance simultaneously with applying the bias voltage.

In embodiments, a vehicle includes a diesel engine, a particle filter for filtering particles from exhaust from the diesel engine and a particle detector for detecting particles included in the exhaust passing the particle filter. Referring to FIG. 3, the particle detector includes a printed circuit board having a pattern of electrically conducted printed lines and terminal pads 301 and 303 which are connected to the power supply circuit without any switch between the power supply circuit and the terminal pads 301 and 303.

Referring to FIGS. 2-6, in embodiments, capacitance between two measuring points (for example, points 501 and 303 in FIG. 2 or points 501 and 507 in FIG. 4) is measured while the bias voltage is being applied between two terminals 301 and 303. Further, referring to FIGS. 2-6, the capacitance is measured multiple times while the engine is operating and while the bias voltage is being applied between two terminals 301 and 303. The measured capacitances of multiple measurements are compared to determine if the particle filter is replaced or repaired. In embodiments, if the difference between two measured capacitances is greater than a threshold, it is determined that the particle filter is replaced or repaired.

Although embodiments of the present invention have been described in detail hereinabove, it will be appreciated that various modifications of the embodiments of the present invention can be made by those skilled in the art within a limit without departing from the scope of the present invention. Therefore, the scope of the present invention should not be limited to the embodiment and should be defined by appended claims to be described below and all modifications or modified forms derived from equivalent concepts to the appended claims.

What is claimed is:

1. An apparatus for detecting a particulate matter (PM), which measures a change in capacitance depending on induction of the particulate matter, the apparatus comprising:
   a power supply unit applying bias voltage for inducing the PM;
   a detection unit forming a magnetic field between two connection terminals to which a detected voltage from the bias voltage is applied, the magnetic field inducing the PM and generating PM resistance by the PM by inducing the PM to the magnetic field; and
   a measurement unit including a first capacitor and a second capacitor in series and measuring the changed capacitance of the first capacitor and the second capacitor according to change in PM resistance by connecting any one capacitor to the detection unit in parallel.

2. The apparatus of claim 1, wherein the power supply unit further
   includes bias resistance connected to a terminal to which the bias voltage is applied in series, and
   controls the detected voltage applied from the bias voltage by controlling the bias resistance.

3. The apparatus of claim 2, wherein the bias resistance adopts Mega ohm (MΩ) based resistance and is set to minimally output the capacitance before applying the bias voltage.

4. The apparatus of claim 1, wherein when the PM resistance increases and a short-circuit thus occurs, the detection unit increases the capacitance of the measurement unit to the maximum value by cutting off any one capacitor connected in parallel between the first capacitor and the second capacitor.

5. The apparatus of claim 1, wherein the power supply unit and the measurement unit are electrically separated from each other to apply the bias voltage without a switching operation and measure the capacitance simultaneously with applying the bias voltage.

6. A method for detecting a particulate matter, the method comprising:
   applying, by a power supply unit, bias voltage for inducing the PM;
   forming, by a detection unit, a magnetic field between two connection terminals to which a detected voltage from the bias voltage is applied, the magnetic field inducing the PM and generating PM resistance by the PM by inducing the PM to the magnetic field; and
   measuring, by a measurement unit including a first capacitor and a second capacitor m series and connecting any one capacitor to the detection unit in parallel, changed capacitance of the first capacitor and the second capacitor according to a change in PM resistance.

7. The method of claim 6, wherein the applying of the voltage includes controlling the detected voltage of the detection unit by controlling bias resistance connected to a terminal to which the bias voltage is applied in series.

8. The method of claim 6, wherein the generating of the PM resistance includes
   increasing the PM resistance by inducing the PM,
   shorting the detection unit by increasing the PM resistance, and
   cutting off any one capacitor connected in parallel between the first capacitor and the second capacitor.

9. The method of claim 8, wherein the measuring of the capacitance includes increasing the capacitance measured by the measurement unit by cutting off any one capacitor to a maximum value.

* * * * *